US006997140B2

(12) United States Patent
Finlayson

(10) Patent No.: US 6,997,140 B2
(45) Date of Patent: Feb. 14, 2006

(54) TRACKING AND MARKING SYSTEM

(75) Inventor: John Douglas Frank Finlayson, Brendale (AU)

(73) Assignee: Aleis Trakit Pty Ltd., Jandowae (AU)

( * ) Notice: Subject to any disclaimer, the term of this patent is extended or adjusted under 35 U.S.C. 154(b) by 0 days.

(21) Appl. No.: 10/481,410

(22) PCT Filed: Jun. 28, 2002

(86) PCT No.: PCT/AU02/00858

§ 371 (c)(1),
(2), (4) Date: Mar. 23, 2004

(87) PCT Pub. No.: WO03/003820

PCT Pub. Date: Jan. 16, 2003

(65) Prior Publication Data

US 2004/0144333 A1 Jul. 29, 2004

(30) Foreign Application Priority Data

Jul. 4, 2001 (AU) .................................... PR6122
Nov. 23, 2001 (AU) .................................... PR9024

(51) Int. Cl.
*A01K 11/00* (2006.01)

(52) U.S. Cl. ...................................... 119/858; 119/840

(58) Field of Classification Search ................ 119/858, 119/840, 841, 842, 843; 452/150, 184; 99/388; 40/300, 301, 302, 303, 304; 198/339.1, 340
See application file for complete search history.

(56) References Cited

U.S. PATENT DOCUMENTS 3,788,276 A * 1/1974 Propst et al. ............... 119/174
3,844,273 A * 10/1974 Polson ....................... 600/551
3,916,484 A * 11/1975 Kennedy .................... 452/159
3,948,249 A * 4/1976 Ambrosini .................. 600/551
4,034,668 A * 7/1977 Picknick et al. .............. 101/35
4,158,903 A * 6/1979 Ochylski .................... 452/168
4,247,758 A * 1/1981 Rodrian ......................... 377/6
RE30,594 E * 4/1981 Samis ........................ 433/229
4,280,813 A * 7/1981 DeGoler ........................ 8/404
4,313,271 A * 2/1982 Bauer .......................... 40/304
4,537,150 A * 8/1985 Bowers ................... 119/14.17
4,618,861 A * 10/1986 Gettens et al. ........... 340/10.41
4,763,605 A * 8/1988 Braum .................... 119/14.03
5,322,034 A * 6/1994 Willham et al. ......... 340/10.41
5,653,192 A * 8/1997 Sheen et al. ............. 119/51.02
5,711,246 A * 1/1998 Yano et al. .............. 119/51.02
5,790,047 A * 8/1998 Golan ..................... 340/10.42
RE36,664 E * 4/2000 O'Brien et al. ............. 452/157
6,111,508 A * 8/2000 Ensor et al. ............. 340/573.2
6,427,627 B1 * 8/2002 Huisma .................. 119/51.02
6,497,197 B1 * 12/2002 Huisma ....................... 119/75
6,558,352 B1 * 5/2003 Hogan ........................ 604/154

(Continued)

OTHER PUBLICATIONS

International Preliminary Examination Report for PCT/AU02/00858; Nov. 19, 2002.

*Primary Examiner*—Yvonne R. Abbott
(74) *Attorney, Agent, or Firm*—Shoemaker and Mattare

(57) ABSTRACT

An identification apparatus for animals or carcasses carrying electronic identification devices, (EID) (2) moving past an antenna (10). The identification apparatus including motion sensing means (12, 13, 14, 17) and marking means (16) adapted mark the animals or carcasses according to whether EID (2) is present, absent or non-functioning, whereby the animals' carcasses can be identified, drafted or sorted according to marking supplied.

12 Claims, 2 Drawing Sheets

U.S. PATENT DOCUMENTS 6,651,585 B2 * 11/2003 van den Berg .......... 119/51.02
6,684,810 B2 * 2/2004 Martin .................... 119/51.02
6,734,789 B1 * 5/2004 Ligard ..................... 340/426.1
6,833,790 B2 * 12/2004 Mejia et al. ............. 340/572.7
2003/0075053 A1 * 4/2003 Khodabandehloo et al. .. 99/388
2003/0226522 A1 * 12/2003 Thibault ..................... 119/842
2003/0236063 A1 * 12/2003 Woods et al. ............... 452/150
2005/0011466 A1 * 1/2005 Doyle, II .................... 119/518

* cited by examiner

TRACKING AND MARKING SYSTEM

FIELD OF THE INVENTION

This invention relates to the livestock industry in particular but not limited to a method and apparatus for enabling identification of animals and/or carcasses with non-electronic identification devices (EID) carrying animals or carcasses with EID from animals or carcasses carrying non-functioning EID.

BACKGROUND OF THE INVENTION

The identification and tracking of animals and/or carcasses prior to and throughout being processed at an abattoir, saleyard or movement is extremely important. A principal purpose of electronically identifying animals is to individually identify animals or carcasses in a lot or run as well as the need to have a direct link to a national database for checking residue status as well as recording movements and a whole of life history of individual animals. This can be achieved as each animal or carcass passes an antenna designed to read EID carried by the animals or carcasses. If an animal or carcass does not carry an EID or its EID is not functioning, and is thus not able to be read by the antenna then that animal or carcass will be included in the lot or run and will be counted in error. The inclusion of animals or carcasses which are unable to be accounted for, can have disastrous consequences where animals or carcasses that have been electronically identified and are known to be disease free are inadvertently mixed with diseased animals or carcasses that have non-functioning EID and have been included in the lot or run. This has become especially important with the outbreaks of bovine spongiform encephalitis (BSE) and foot and mouth disease in the United Kingdom, Europe and South America. In order to protect the animals or carcasses in countries, which are not as yet affected by these or other diseases, various methods of identifying and tracking animals or carcasses have been developed. Among the more effective tracking and identification systems is the use of electronic ear tags or rumen pellets, which are ingested by a ruminant animal, or the use of other electronic identification devices. Prior art have been described in Patent Nos. WO 97/46083 and WO 93/22907 in the case of tags and PCT/AU95/00218 in the case of pellets.

OBJECT OF THE INVENTION

It is therefore an object of the present invention to provide an apparatus and a method that seeks to overcome some of the disadvantages and limitations of the prior art or to at least provide the public with a useful choice.

STATEMENT OF THE INVENTION

According to one aspect, the invention resides in an identification apparatus for use with animals or carcasses, the apparatus including in combination electronic reading means having an antenna to read electronic signals from electronic identification devices (EID) carried by animals or carcasses moving past the antenna, marking means adapted to mark the animals or carcasses with a visually distinct substance typically paint, powder, or dye, or any other marking substance by which animals or carcasses can be visually distinguished for counting, drafting or sorting, motion sensing means adapted to detect the animal or carcass moving past the motion sensing means, control means adapted to control and co-ordinate the operations of the EID reading means, the motion sensing means and the marking means, wherein in use, animals or carcasses which pass the motion sensing means and the antenna and have either activated or not activated the electronic reading means are selectively marked or not marked by the marking means so that the animals or carcasses can be selectively identified and counted, drafted or sorted according to their markings.

Preferably the identification apparatus is portable and easily transportable.

Preferably, there is a race or defined passage for animals or carcasses to ensure correct operation of the identification apparatus herein described.

The EID are preferably in the form of ingested rumen pellets, tags or other transponder devices attached or inserted into animals or carcasses which are actuated and detected by circuitry of the antenna.

Preferably, the marking means comprises a solenoid or other equivalent device, or hydraulic or pneumatic actuators used to brush, spray or otherwise paint a mark on the back or another part of the animal or carcass. In the alternative, other marking means such as powder marking means can be used to achieve the same effect.

In one version, the marking means can include multiple spray heads of different coloured substance such as paint or powder from several pressure packs or airless spray devices or can comprise a single spray head having access to several pressure pack spray devices.

Preferably, there is a visual and/or an audible alarm system such as a light and/or a buzzer or bell, respectively which is actuated when an animal or a carcass passes an antenna without activating the electronic reading means and is marked by the marking means.

Preferably, the positions of the antenna, the marking means and the motion sensing means are adjustable to suit animals or carcasses of various sizes.

In another version, the mark can be an identifiable shape such as a circle or square or star or other markings including numbers or letters or a combination of the same and in different colours.

Preferably the motion sensing means is photoelectric sensing means wherein a beam of light between a photo emitter and a photo sensor device is interrupted by the passage of an animal or carcass.

In the alternative, the motion sensing means can be infrared (IR) sensing means or microwave sensing means where infrared and microwave beams, respectively, are interrupted by the passage of the animal or carcass or can be any other motion sensing means.

Preferably, the control means is microprocessor control means adapted to co-ordinate signals received from the antenna and the motion sensing means to cause activation or de-activation of the marking means under the correct conditions.

Preferably, the EID reading means and the motion sensing means can be operated independently to provide independent means of counting animals or carcasses such as by computerised means or visually and manually counting or other counting means.

Preferably, the marking means can be operated independently of the EID reading means or in conjunction with either the EID reading means, or the motion sensing means to provide an ability to mark non-EID, EID or non-functioning EID carrying animals or carcasses as required.

Preferably, the marking means is adapted to apply one or more than one coloured mark allowing for different groups of animals or carcasses to be marked with different colours or marks as required.

Preferably, the identification apparatus is mains powered but can also be powered by a battery back up system having solar or other sources of charging the battery.

In another aspect the invention resides in a method of identifying non-EID and non-functioning EID carrying animals or carcasses from EID carrying animals or carcasses including the steps of:

a) moving animals or carcasses along a race or defined passage associated with an antenna of an EID reading means, a motion sensing means and a marking means, the operation of all of which is controlled and coordinated by microprocessor control means;

b) marking with a distinguishing or identifiable colour marking substance typically a paint, powder, dye, or other marking substance, animals or carcasses which have passed the antenna without recording a signal where the EID is non-functioning or absent but which have been detected by the motion sensing means; actuating a visual and or audible alarm, and c) visually identifying the animals or carcasses so marked by their distinguishable marks thereby allowing for the drafting or sorting and or identification of particular animals or carcasses.

BRIEF DESCRIPTION OF THE DRAWINGS

In order that the present invention be more readily understood and put into practical effect, reference will now be made to the accompanying illustrations wherein.

DETAILED DESCRIPTION OF THE DRAWINGS

EXAMPLE 1

Figure 1:
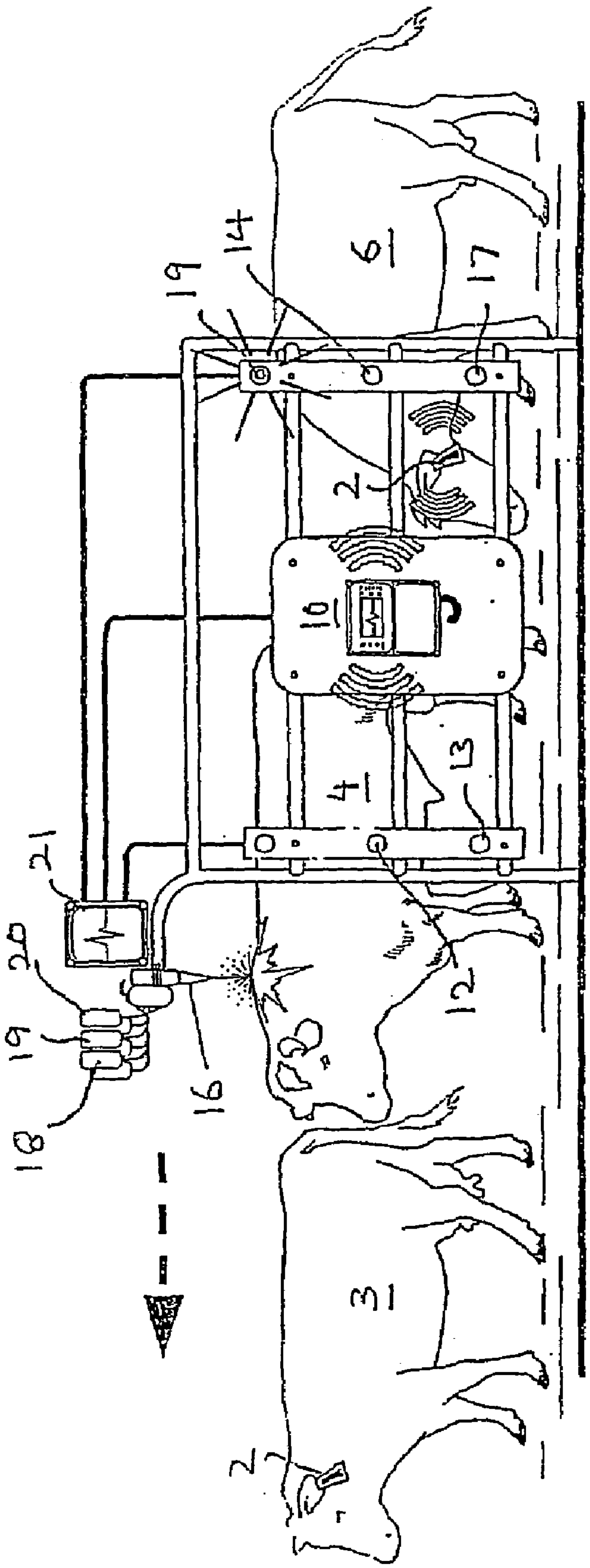
FIG. 1 is a side view of a preferred embodiment of the invention according to Example 1.

Referring now to FIG. 1, there is shown a preferred embodiment of the invention according to Example 1. There is shown an antenna 10 for reading electronic signals from electronic identification transponders housed in rumen pellets, ear tags 2 or other devices on animals 3,4,6 as they pass by the antenna. The antenna operates in conjunction with one or more strategically located motion sensing means 12, 13, 14, 17 preferably in the form of photo sensing means comprising a photo emitter device for example, a light emitting diode (LED) which emits a beam of light received by photo sensor devices such as a photo cell. It will be clear to those skilled in the art that other suitable sensors can also be used. Interruption of the light beam by an animal results in a signal sent to the control means (not shown). The control means 21 determines whether or not the passing animal is carrying functioning or non-functioning or not carrying EID (2) before deciding whether or not to activate the marking means 16.

Preferably, there is also a visual and/or audible alarm 19 such as a light and a buzzer or bell which is actuated as an animal 6 passes the antenna without the electronic reading means detecting the presence of an EID. If there is a functioning EID then the animal may be allowed to proceed without being marked. Alternatively, the animal may be marked with a distinctly different mark to that used for non-EID or non-functioning EID carrying animals. If there has been no reading of the EID such as where the EID is not functioning or in the absence of an EID, the marking means is activated by the control means to apply a different identifiable or distinguishable coloured mark to the animal. The marking means 16 can be any of a variety of types including those actuated mechanically or as shown preferably in the form of a solenoid operated battery of pressure or airless spray units 18,19,20, to effect marking with a coloured paint, powder, dye or any other marking substance, preferably of a distinguishable tone or shade for ready visual identification and to allow for easy drafting or sorting of particular animals. In the alternative, the marking means can comprise powder dispensing means whereby a blotch of coloured powder or any other marking, can be applied to an animal to achieve the same effect. In some versions, the markings can be identifiable shapes such as circles or squares or can be a number or a letter or a combination of the same. The motion sensing means is preferably able to operate independently of the transponder reading means so that it can also function as a secondary counting means. Preferably the marking means can also be operated independently of the transponder reading means but in co-operation with the motion sensing means thereby allowing for particular groups of animals to be marked as they pass the motion sensing means which activates the marking means via the control means 21. The marking means can include multiple spray heads 18, 19, 20 spraying different coloured substance from several pressure pack or airless spray devices or can comprise a single spray head (not shown) having access to several pressure pack spray devices of different coloured substance allowing for different groups of animals to be marked with different colours or markings of different shapes, numbers or letters or a combination of the same.

Multiple colours or other markings, or mixes of colours together with other markings can also be used. Animals that trigger the reader can be marked differently to animals carrying no or non-functioning EID. For example, one set could be marked red, the other, white for all the animals in one lot/pen. Another combination, say red, for animals carrying functioning EID and yellow for those carrying no or non-functioning EID, could be used for animals in another pen to maintain their separate identities, for example, if they are later merged. This will allow them to be separated into their required groupings.

Preferably the antenna, the marking means and the motion sensing means are height adjustable to accommodate animals of different sizes. Preferably the system is mains powered but has a generator and/or a battery back up system which can be solar charged or charged by a wind generator or other equivalent means.

EXAMPLE 2

Figure 2:
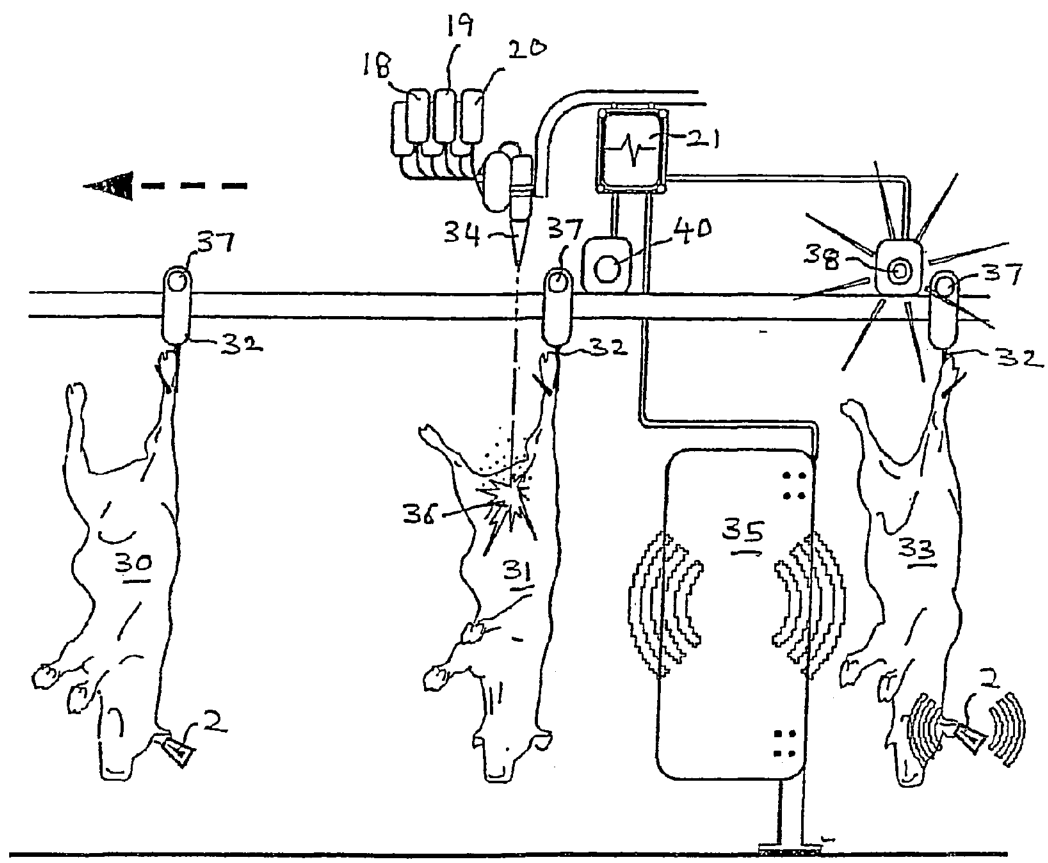
FIG. 2 is a side view of the invention according to Example 2.

Referring now to FIG. 2, there is shown another preferred embodiment of the invention according to Example 2. There is shown a carcass 30 mounted on a hook 32 which is transported along a conveyor system as part of a kill chain in an abattoir application. Electronic identification devices (not shown) such as rumen pellets or ear tags 2 or other transponder devices carried by the carcass activate/deactivate the signal sent by the sensors of the antenna 35 which controls the marking means 34, causing the carcass to be sprayed with a mark 36 according to criteria determined by a microprocessor control means 21.

If there is a functioning EID then the carcasses may be allowed to proceed without being marked. Alternatively, the carcass may be marked with a distinctly different mark to that used for non-EID or non-functioning EID carrying carcasses. If there has been no reading of the EID such as where the EID is not functioning or in the absence of an EID, the marking means can be activated or deactivated by the control means to apply a different identifiable or distinguishable coloured mark to the carcass. The marking means 34 can be any of a variety of types including those actuated mechanically or as shown preferably in the form of a solenoid operated battery of pressure or airless spray units 18,19,20, to effect marking with a coloured paint, powder, dye or any other marking substance, preferably of a distinguishable tone or shade for ready visual identification and to allow for easy drafting or sorting of particular carcasses. In the alternative, the marking means can comprise powder dispensing means whereby a blotch of coloured powder or any other marking, can be applied to a carcass to achieve the same effect. In some versions, the markings can be identifiable shapes such as circles or squares or can be a number or a letter or a combination of the same. The motion sensing means is preferably able to operate independently of the EID reading means so that it can also function as a secondary counting means. Preferably the marking means can also be operated independently of the EID reading means but in co-operation with the motion sensing means thereby allowing for particular groups of carcasses to be marked as they pass the motion sensing means which activates the marking means via the control means 21. The marking means can include multiple spray heads 18, 19, 20 spraying different coloured substance from several pressure pack or airless spray devices or can comprise a single spray head (not shown) having access to several pressure pack spray devices of different coloured substance allowing for different groups of carcasses to be marked with different colours or markings of different shapes, numbers or letters or a combination of the same.

Multiple colours or other markings, or mixes of colours together with other markings can also be used. Carcasses that trigger the reader can be marked differently to carcasses carrying no or non-functioning EID. For example, one set could be marked red, the other, white for all the carcasses in one lot. Another combination, say red, for carcasses carrying functioning EID and yellow for those carrying no or non-functioning EID, could be used for carcasses in another pen to maintain their separate identities, for example, if they are later mixed. This will allow the carcasses to be separated into their required groupings.

Preferably there is a visual and/or audible alarm system 38 such as a light and a buzzer or bell which is actuated if a carcass 31 carrying a non functioning EID or a carcass without an EID passes the sensors. Preferably the position of the antenna and the marking means can be adjusted to accommodate carcasses of different sizes. In Example 2, the motion sensing means preferably comprises motion sensors 37 in the hook and along the conveyor system 40.

The system is preferably mains powered but has the facility in the case of power failure for a generator or battery back up system with solar charging or other equivalent battery charging means to provide an alternative source of power.

It will be evident to the skilled addressee that carcasses of animals can be distinguishable by the marks applied to the carcass thereby allowing for the sorting and counting and identification of particular carcasses.

Preferably in both Examples 1 and 2, the entire identification apparatus is portable and easily transportable for installation in different locations.

ADVANTAGES

The advantages of the present invention over the prior art can be said to include the following:

The identification of animals or carcasses which do not carry EID, are carrying EID or are carrying non-functioning EID.

The provision of a secondary counting system for counting animals or carcasses which is independent of an EID reading means.

A marking system to enable easy visual identification of animals or carcasses so marked to facilitate the drafting or sorting and identification of particular animals or carcasses.

The ability to mark groups of animals or carcasses with different colours, markings of different shapes, numbers or letters or a combination of the same.

Suitable for general management of saleyard, abattoir or any livestock but not limited to these operations—regardless of any computerised database system utilised.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps. The term animal or carcass refers to that of livestock, birds and other animals, respectively. The term EID refers to electronic identification devices such as ear tags, rumen pellets and any other device used to house a transponder, being singular or plural as applicable.

What is claimed is:

1. An identification apparatus for use with animals or carcasses, the apparatus including in combination:

electronic reading means to read electronic signals from electronic identification devices (EID) carried by animals or carcasses moving past the electronic reading means;

marking means adapted to mark the animals or carcasses; and motion sensing means adapted to detect the animal or carcass moving past the motion sensing means, wherein in use, animals or carcasses which pass the motion sensing means and the electronic reading means are selectively marked by the marking means in response to whether the electronic reading means reads a signal from an electronic identification device.

2. An identification apparatus as claimed in claim 1, wherein the EID are ingested rumen pellets, tags or other transponder devices attached or inserted into animals or carcasses which are actuated and detected by circuitry of the electronic reading means.

3. An identification apparatus as claimed in claim 1, wherein the marking means comprises a solenoid or other equivalent device, or hydraulic or pneumatic actuators used to brush, spray or otherwise paint a mark on the back or another part of the animal or carcass.

4. An identification apparatus as claimed in claim 1, wherein the marking means includes multiple single spray heads from several pressure packs or airless spray devices of different colored substance such as paint or powder.

5. An identification apparatus as claimed in claim 1, wherein the marking means includes a single spray head having access to several pressure pack or spray devices of different colored substances such as paint or powder.

6. An identification apparatus as claimed in claim 1, further comprising a visual and/or an audible alarm system such as a light and/or buzzer or bell, respectively which is actuated when an animal or a carcass passes the electronic reading means without activating the electronic reading means and is marked by the marking means.

7. An identification apparatus as claimed in claim 1, wherein the mark can be an identifiable shape such as a circle or square or star or other markings including numbers or letters or a combination of the same and in different colors.

8. An identification apparatus as claimed in claim 1, wherein the motion sensing means can be infrared sensing means where an infrared beam is interrupted by the passage of the animal or carcass.

9. An identification apparatus as claimed in claim 1, wherein the motion sensing means can be microwave sensing means where a microwave beam is interrupted by the passage of the animal or carcass or can be any other motion sensing means.

10. An identification apparatus as claimed in claim 1, further comprising a control means wherein the control means is a microprocessor control means adapted to co-ordinate signals received from the electronic reading means and the motion sensing means to cause activation or de-activation of the marking means.

11. An identification apparatus as claimed in claim 1, wherein the marking means can be operated independently of the electronic reading means or in conjunction with either the electronic reading means, or the motion sensing means to provide an ability to mark non-EID, EID or non-functioning EID carrying animals or carcasses as required.

12. A method of identifying non-EID and non-functioning EID carrying animals or carcasses from EID carrying animals or carcasses, said method including steps of:

(a) moving animals or carcasses along a race or defined passage associated with an electronic reading means, a motion sensing means and a marking means, the operation of all of which is controlled and co-ordinated by microprocessor control means; and (b) marking with a distinguishing or identifiable marking substance animals or carcasses which have passed the electronic reading means without recording a signal where the EID is non-functioning or absent but which have been detected by the motion sensing means; actuating a visual and/or audible alarm.

* * * * *